US012579255B2

(12) United States Patent
Lee et al.

(10) Patent No.: US 12,579,255 B2
(45) Date of Patent: Mar. 17, 2026

(54) DATA STORAGE DEVICE PERFORMING DATA PROTECTION AND HOST DEVICE SUPPORTING A DATA PROTECTION FUNCTION USING A PROGRAM CONTEXT

(71) Applicants: SK hynix Inc., Icheon (KR); Seoul National University R&DB Foundation, Seoul (KR)

(72) Inventors: Sanggu Lee, Seoul (KR); Jihong Kim, Seoul (KR)

(73) Assignees: SK hynix inc., Icheon (KR); Seoul National University R&DB Foundation, Seoul (KR)

( * ) Notice: Subject to any disclaimer, the term of this patent is extended or adjusted under 35 U.S.C. 154(b) by 215 days.

(21) Appl. No.: 18/162,583

(22) Filed: Jan. 31, 2023

(65) Prior Publication Data

US 2024/0070264 A1      Feb. 29, 2024

(30) Foreign Application Priority Data

Aug. 23, 2022    (KR) ......................... 10-2022-0105472

(51) Int. Cl.
*G06F 21/54* (2013.01)
*G06F 21/55* (2013.01)
*G06F 21/56* (2013.01)

(52) U.S. Cl.
CPC ............ *G06F 21/54* (2013.01); *G06F 21/554* (2013.01); *G06F 21/568* (2013.01)

(58) Field of Classification Search
CPC ...... G06F 21/54; G06F 21/554; G06F 21/568; G06F 21/62
See application file for complete search history.

(56) References Cited

U.S. PATENT DOCUMENTS

| | | | | |
|---|---|---|---|---|
| 5,493,723 | A * | 2/1996 | Beck ................... | G06F 11/3648 |
| | | | | 714/E11.214 |
| 5,829,051 | A * | 10/1998 | Steely, Jr. .......... | G06F 12/0864 |
| | | | | 711/216 |
| 5,933,651 | A * | 8/1999 | Masuda ................ | G05B 19/05 |
| | | | | 712/42 |
| 7,047,272 | B2 * | 5/2006 | Giacalone ................ | G06F 5/01 |
| | | | | 712/E9.032 |
| 7,421,570 | B2 | 9/2008 | Padmanabhan et al. | |
| 9,053,790 | B1 * | 6/2015 | Hu ..................... | G11C 13/0069 |
| 9,952,863 | B1 * | 4/2018 | Blasco ................... | G06F 11/36 |

(Continued)

OTHER PUBLICATIONS

Brown, Angela Demke, Todd C. Mowry, and Orran Krieger. "Compiler-based I/O prefetching for out-of-core applications." ACM Transactions on Computer Systems (TOCS) 19.2 (2001): 111-170. (Year: 2001).*

(Continued)

*Primary Examiner* — Kari L Schmidt

(57) ABSTRACT

A data storage device includes a memory device including a whitelist storing one or more program contexts for identifying input/output (I/O) operation, and a control circuit including a whitelist managing circuit configured to determine whether a write request is allowable by comparing the whitelist with one or more program contexts transmitted with the write request from a host. The program contexts may be generated using program counter values corresponding to call operations performed by the I/O operation.

7 Claims, 5 Drawing Sheets

<Database Program>          <Ransomware Code>

(56) References Cited

U.S. PATENT DOCUMENTS

| | | | | |
|---|---|---|---|---|
| 11,847,207 | B2 * | 12/2023 | Motil | G06F 21/54 |
| 2003/0070117 | A1 * | 4/2003 | Matsuki | G06F 11/261 |
| | | | | 714/25 |
| 2005/0273757 | A1 * | 12/2005 | Anderson | G06F 8/75 |
| | | | | 717/100 |
| 2008/0244369 | A1 * | 10/2008 | Jiang | G06F 11/1032 |
| | | | | 712/E9.034 |
| 2013/0086330 | A1 * | 4/2013 | Baddepudi | G06F 12/0868 |
| | | | | 711/143 |
| 2014/0196045 | A1 * | 7/2014 | Kurata | G06F 9/462 |
| | | | | 718/102 |
| 2015/0089185 | A1 * | 3/2015 | Brandyberry | G06F 11/2058 |
| | | | | 711/207 |
| 2016/0378687 | A1 * | 12/2016 | Durham | H04L 9/3242 |
| | | | | 713/193 |
| 2018/0089088 | A1 * | 3/2018 | Jakowski | G06F 12/0804 |
| 2018/0137062 | A1 * | 5/2018 | Awad | G06F 12/0802 |
| 2019/0179779 | A1 * | 6/2019 | Friedley | G06F 9/546 |
| 2020/0366626 | A1 * | 11/2020 | Tong | H04L 49/9078 |
| 2021/0294692 | A1 * | 9/2021 | Chen | G06F 9/30189 |
| 2022/0206816 | A1 * | 6/2022 | Soundararajan | G06F 9/3836 |
| 2023/0095461 | A1 * | 3/2023 | Jayasena | G06F 12/0811 |
| 2023/0114084 | A1 * | 4/2023 | Porteboeuf | G06F 21/54 |
| | | | | 713/189 |
| 2024/0036735 | A1 * | 2/2024 | Wang | G06F 3/0611 |

OTHER PUBLICATIONS

Lee, Sanggu, et al. "Alohomora: Protecting files from ransomware attacks using fine-grained I/O whitelisting." Proceedings of the 14th ACM Workshop on Hot Topics in Storage and File Systems. 2022, pp. 113-118. (Year: 2022).*
Chris Gniady et al. "Program-counter-based pattern classification in buffer caching", USENIX Association, In Proceedings of the 6th conference on Symposium on Operating Systems Design & Implementation—2004, vol. 6 (OSDI'04), USA.
William Turton et al. "Hackers breached colonial pipeline using compromised password", Bloomberg, https://www.bloomberg.com/news/articles/2021-06-04/hackers-breached-colonial-pipeline-usingcompromised-password, 2021.
Greg Cusack et al. "Machine learning-based detection of ransomware using SDN", In Proceedings of ACM International Workshop on Security in Software Defined Networks & Network Function Virtualization, 2018.
Christopher Chew et al. "Behaviour based ransomware detection", In Proceedings of International Conference on Computers and Their Applications, 2019, pp. 127-136, vol. 58.
Ammar Ahmed E. Elhadi et al. "Improving the detection of malware behaviour using simplified data dependent API call graph", International Journal of Security and Its Applications, 2013, pp. 29-42, vol. 7, No. (5).
Jian Huang et al. "FlashGuard: leveraging intrinsic flash properties to defend against encryption ransomware", In Proceedings of ACM SIGSAC Conference on Computer and Communications Security, 2017.
Jisung Park et al. "RansomBlocker: a low-overhead ransomware-proof SSD", In Proceddings of Design Automation Conference, 2019.
SungHa Baek et al. "SSD-insider: internal defense of solid-state drive against ransomware with perfect data recovery". In Proceedings of International Conference on Distributed Computing Systems, 2018, pp. 875-884.

"Enable controlled folder access", Microsoft Docs Article, https://docs.microsoft.com/en-us/microsoft-365/security/defender-endpoint/enable-controlled-folders?view=o365-worldwide, 2021.
Lawrence Abrams "Windows 10 ransomware protection bypassed using DLL injection", https://www.bleepingcomputer.com/news/security/windows10-ransomware-protection-bypassed-using-dll-injection, 2018, Bleeping Computer LLC.
Antonio Lopez, "Malware in Linux: kernel-mode-rootkits", https://www.incibe-cert.es/en/blog/kernel-rootkits-en, 2015.
Security Ninja "Rootkits: kernel mode", https://resources.infosecinstitute.com/topic/rootkits-user-mode-kernel-mode-part-2/, Jul. 15, 2015.
"Kernel Module signing facility", The Linux kernel documentation. https://www.kernel.org/doc/html/v4.15/admin-guide/module-signing.html, 2021.
"Windows 7 code integrity (ci.dll) security policy", https://csrc.nist.gov/csrc/media/projects/cryptographic-module-validationprogram/documents/security-policies/140sp1327.pdf, 2013, V. 4.3.
Mark Ermolov et al. "Microsoft Windows 8.1 kernel patch protection analysis", https://www.ptsecurity.com/upload/corporate/ru-ru/analytics/Windows_81_Kernel_Patch_Protection_Analysis.pdf, Positive Technologies, 2014.
"Radare2: Unix-Like Reverse Engineering Framework", https://github.com/radareorg/radare2, 2021.
"Linker and libraries guide", https://docs.oracle.com/cd/E26505_01/html/E26506/glmqp.html, 2022.
"Source files for SiFive's Freedom platforms", https://github.com/sifive/freedom, 2022.
"Xilinx virtex-7 FPGA vc707 evaluation kit", https://www.xilinx.com/products/boards-and-kits/ek-v7-vc707-g.html, 2021.
"The OpenSSD Project", OpenSSDWiki, http://openssd.io/, Jun. 5, 2017.
"OpenSSD-OpenChannelSSD", https://github.com/CRZ-Technology/OpenSSD-OpenChannelSSD, 2021.
"GonnaCry Rasomware", https://github.com/tarcisio-marinho/GonnaCry, 2020.
"RAASNet", https://github.com/leonv024/RAASNet, 2021.
"Ransom0", https://github.com/HugoLB0/Ransom0, 2021.
"Hidden-tear", https://github.com/starflame/Hidden-tear, 2019.
"FScoiety ransomware", https://github.com/graniet/fsociety-ransomware-MrRobot, 2020.
"Changes and Improvements in MariaDB 10.10", https://mariadb.com, 2022.
"RocksDB", http://rocksdb.org, 2021.
"GCC, the GNU compiler collection", GNU Project, https://gcc.gnu.org, 2022.
"Build Your Free Enterprise Backup Software System with Bacula Tools", Bacula, https://www.bacula.org, 2021.
"Sysbench", https://github.com/akopytov/sysbench, 2021.
"Db_bench", RocksDB document, https://www.bookstack.cn/read/rocksdb-en/961dd924ca767aa1.md, 2019.
"TN29-14: Increasing NAND Flash Performance", Micron, https://www.micron.com/-/media/client/global/documents/products/technical-note/nand-flash/tn2914.pdf, 2006.
Casey Crane "20 Ransomware Statistics You're Powerless to Resist Reading", https://securityboulevard.com/2020/02/20-ransomware-statistics-youre-powerless-to-resist-reading/, 2020.
Sanggu Lee et al. "Alohomora: protecting files from ransomware attacks using fine-grained I/O whitelisting", in Proceedings of the 14th ACM Workshop, Association for Computing Machinery, Jan. 2022, pp. 113-118, https://doi.org/10.1145/3538643.3539749, New York, NY, USA.

* cited by examiner

FIG. 4

| Logical Address (Page Number) | Program Context List (PRCS) |
|---|---|
| 100 | 27 |
| 500 | 79, 99 |

DATA STORAGE DEVICE PERFORMING DATA PROTECTION AND HOST DEVICE SUPPORTING A DATA PROTECTION FUNCTION USING A PROGRAM CONTEXT

CROSS-REFERENCE TO RELATED APPLICATIONS

The present application claims priority under 35 U.S.C. § 119(a) to Korean Patent Application No. 10-2022-0105472, filed on Aug. 23, 2022, which is incorporated herein by reference in its entirety.

BACKGROUND

1. Technical Field

Embodiments relate to a data storage device that protects data by blocking input/output operations by malicious programs such as ransomware, and a host device that supports a data protection function using a program context.

2. Related Art

Malicious programs such as ransomware cause great damage by encrypting files without the user's knowledge and making them unusable.

To prevent this, a method of detecting and removing ransomware in advance can be adopted. However, it is difficult to completely block all ransomware in advance as new ransomware is constantly appearing.

In addition, the conventional windows operating system introduces a whitelist method to allow only allowed application programs access to a folder or a file for which a protection function is set.

However, even if the whitelist method is used at the application level, damage caused by malicious ransomware code cannot be prevented if the ransomware code is injected into the allowed application itself.

SUMMARY

In accordance with an embodiment of the present disclosure, a data storage device may include a memory device including a whitelist, the whitelist storing a program context for identifying an input/output (I/O) operation; and a control circuit including a whitelist managing circuit, the whitelist managing circuit configured to determine whether a write request is allowable by comparing the whitelist with one or more program contexts transmitted with the write request.

In accordance with an embodiment of the present disclosure, a host device may include a processor operating according to an operating system (OS), wherein the processor includes a program context register configured to store a program context corresponding to an input/output (I/O) operation; and a program context control circuit configured to update the program context using a program counter value of a function corresponding to the I/O operation when the function is called, the function being one of a user function and a system write function.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments that include various features, and explain various principles and beneficial aspects of those embodiments.

FIG. 4 illustrates a data structure of a program context mapping circuit according to an embodiment of the present disclosure.

DETAILED DESCRIPTION

Various embodiments will be described below with reference to the accompanying figures. Embodiments are provided for illustrative purposes and other embodiments that are not explicitly illustrated or described are possible. Further, modifications can be made to embodiments of the present disclosure that will be described below in detail.

In the present embodiment, a program context is information that encodes an execution path up to a call of a system input/output (I/O) function, and the program context may have different values for each I/O operation. Accordingly, respective identities of I/O operations may be determined using the program contexts thereof.

Hereinafter, an I/O operation refers to an operation in which data writing is performed, but is not limited thereto.

In the present embodiment, the system I/O function is a system write function because it is for preventing tampering with data in a data storage device.

In the present embodiment, the program context is calculated by accumulating program counter (PC) values of the functions called by an application before the application called the system write function.

In an embodiment, when a system write function is called in the host, the program context is transmitted to the data storage device. In embodiments, the data storage device is a solid state drive (SSD), but embodiments are not limited thereto.

In the present embodiment, the data storage device internally stores a whitelist that includes program contexts indicating allowed I/O operations.

The data storage device determines whether the transmitted program context is stored in the whitelist, allows the I/O operation if the program context is included in the whitelist, and does not allow the I/O operation otherwise.

Figure 1:
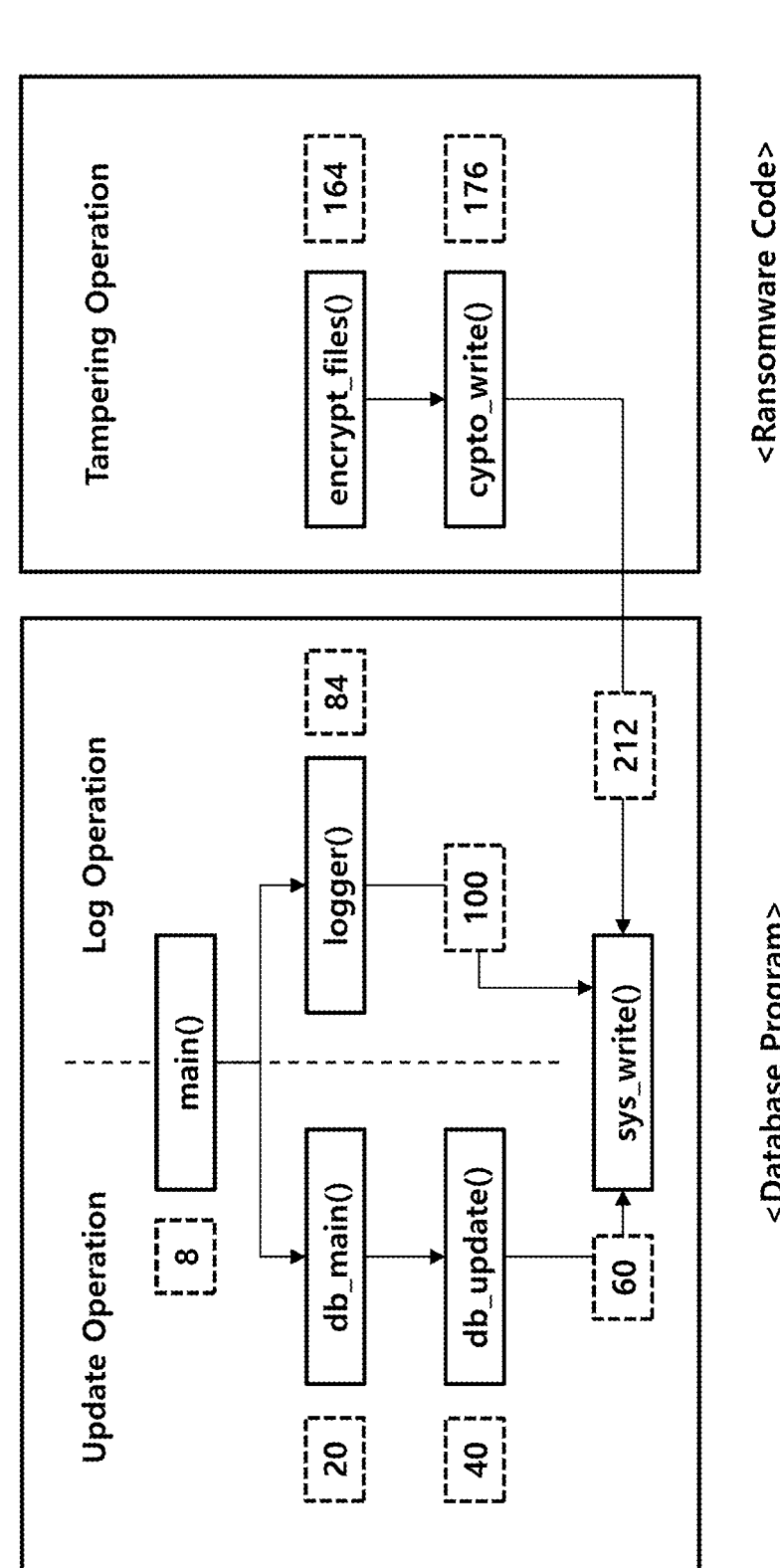
FIG. 1 illustrates a relation between an input/output (I/O) operation and a program context in an embodiment of the present disclosure.

FIG. 1 is a diagram showing a relationship between an I/O operation and a program context.

FIG. 1 illustrates an update operation and a log operation that are two I/O operations that can be used during an execution of a database program that is an application program.

The function calls related to the update operation performed during the operation of the database program proceed in the following order.

main( )→db_main( )→db_update( )→sys_write( )

sys_write( ) is a system write function provided by the kernel software, and the rest are user functions provided by the database program.

The program counter values of the functions called during the update operation, indicated in the accompanying dashed boxes of FIG. 1, are 8, 20, 40, and 60, respectively, and the program context, which is the sum of them, is 128. That is, the program context corresponding to the update operation is 128.

The function calls related to the log operation performed during the operation of the database program proceed in the following order.

main( )→logger( )→sys_write( )

During the log operation, the program counter values corresponding to each function are 8, 84, and 100, respectively, and the program context, is 192; note that the sys_write( ) call executed by the log operation is at a different location (and therefore corresponds to a different program counter value) than the sys_write( ) call executed by the update operation. That is, the program context corresponding to the log operation is 192.

When two I/O operations are allowed in advance, the corresponding program contexts 128 and 192 are stored in the whitelist inside the data storage device.

When the system write function sys_write( ) is executed, the corresponding program context is passed to the data storage device and compared with the whitelist.

In FIG. 1, the ransomware code is code in a ransomware program or code injected into another application program.

In relation to the tampering operation performed by the ransomware code, encrypt_files( ), crypto_write( ), and sys_write( ) are called in order, and the corresponding program counter values are 164, 176, and 212, respectively, and accordingly, the program context corresponding to the tampering operation is 452.

When a system write function is called during a tampering operation, the program context 452 is transmitted to the data storage device. At this time, if the corresponding program context is not included in the whitelist, the write operation fails, and thus data protection against tampering is provided.

Figures 2A, 2B:
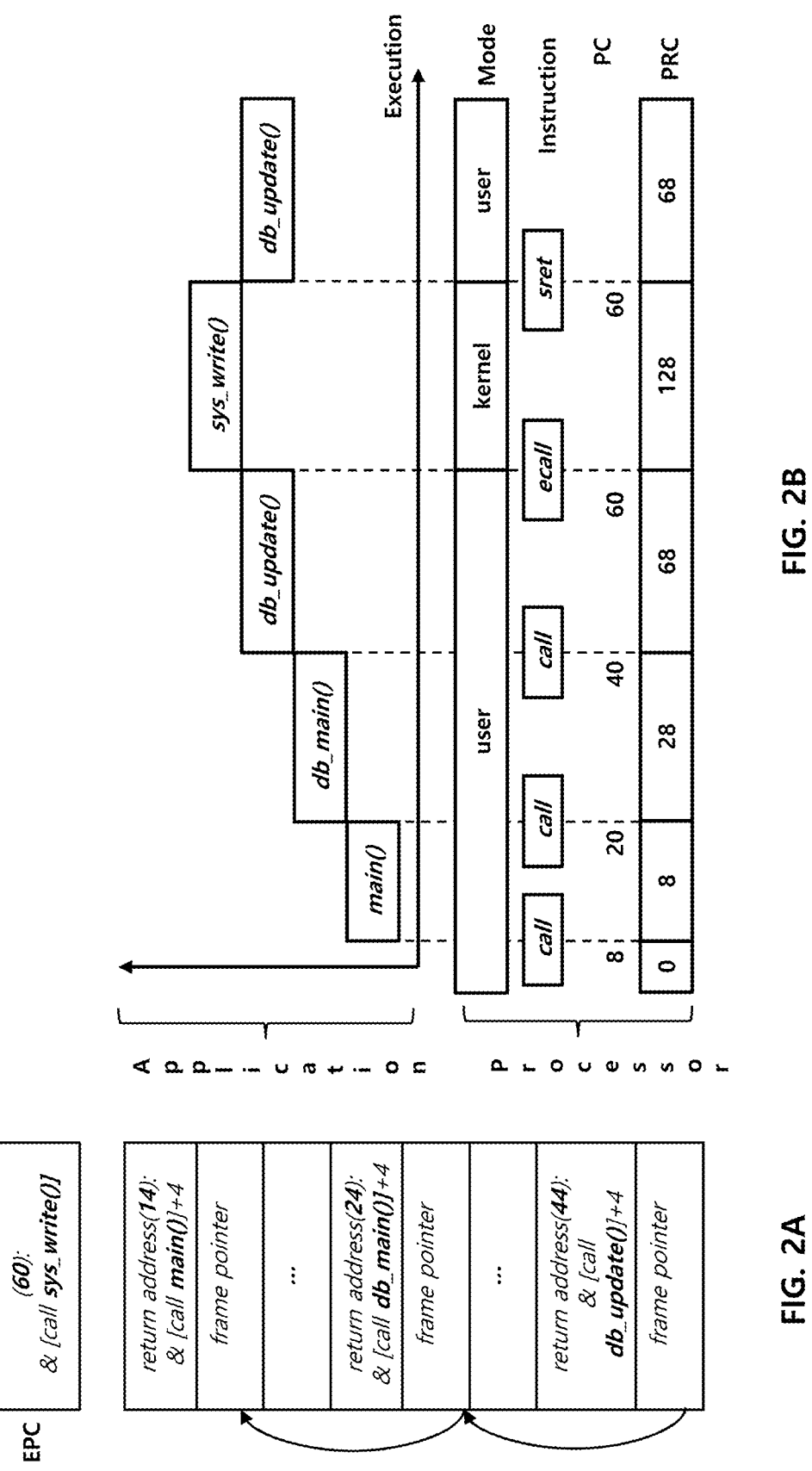
FIGS. 2A and 2B illustrates a calculation operation of a program context.

FIGS. 2A and 2B are diagrams illustrating a process for calculating a program context.

FIG. 2A illustrates a technique for calculating a program context using a frame pointer.

If a frame pointer is used to manage a call stack, the program context can be calculated by tracing the call stack when the system write function is called.

For example, in the above-described update operation, the program counter of the functions main( ), db_main( ), and db_update( ) can be known using the respective return addresses in the call stack.

The program counter corresponding to the system write function can be known through the special register of the processor. In the RISC-V instruction set architecture (ISA), the program counter can be known by reading the EPC register value.

However, the technique illustrated in FIG. 2A cannot generate a program context value when the software compilation process is configured to not use the frame pointer.

FIG. 2B illustrates a process of calculating a program context according to an embodiment of the present disclosure.

In this embodiment, the program context is directly managed inside the processor of the host.

To this end, the processor according to an embodiment of the present disclosure includes a program context register PRC for storing a program context and a program context management circuit.

Conventional processors include a set of special registers that can be managed in a kernel mode.

In the present embodiment, free space in the set of special registers may be used as the program context register, but in another embodiment, a separate register may be added and used as the program context register.

The program context is updated when a function is called in the process of an I/O operation, and may also be updated when the function is returned from.

FIG. 2B illustrates calculation of a program context during the update operation of FIG. 1.

Since the processor knows the program count corresponding to the called function, the program context management circuit inside the processor uses the program counter value corresponding to the called function to update the program context.

The program context management circuit accumulates, for example, a program counter value of 8 corresponding to the main( ) function in the program context register PRC when the main( ) function is called.

Similarly, as execution of the update operation proceeds, program counter values 20 and 40 corresponding to db_main( ) and db_update( ) are sequentially accumulated in the program context register PRC, and when the sys_write( ) function is called, the corresponding program counter value 60 is accumulated in the program context register PRC. Accordingly, the program context becomes 128.

In FIG. 2B, call is an instruction that calls a user function such as main( ), db_main( ), and db_update( ), and ecall is an instruction that calls a system write function such as sys_write( ).

If a return instruction is executed at the end of the function operation, the program counter value associated with the call of the function is subtracted from the program context value.

For example, when the return instruction sret in the sys_write( ) function is executed, the corresponding program counter value 60 associated with the call of the sys_write( ) function is subtracted from the program context, and the program context becomes 68.

As described above, in this embodiment, the program context register PRC is all or a part of a special register accessible in the kernel mode.

When the system write function is executed, a system call processing instruction is executed. When the system call processing instruction is executed, the operation of reading a special register inside the processor is possible, which is a well-known technique in the related arts.

In the present embodiment, when sys_write( ) which is a system write function, is called, the value of the current program context register PRC may be read and output to the outside of the processor through a system call processing instruction.

As such, the program context register PRC is accessible by kernel-mode functions and not accessible by user-mode functions, so it is impossible for malicious code to tamper with the program context register PRC.

Figure 3:
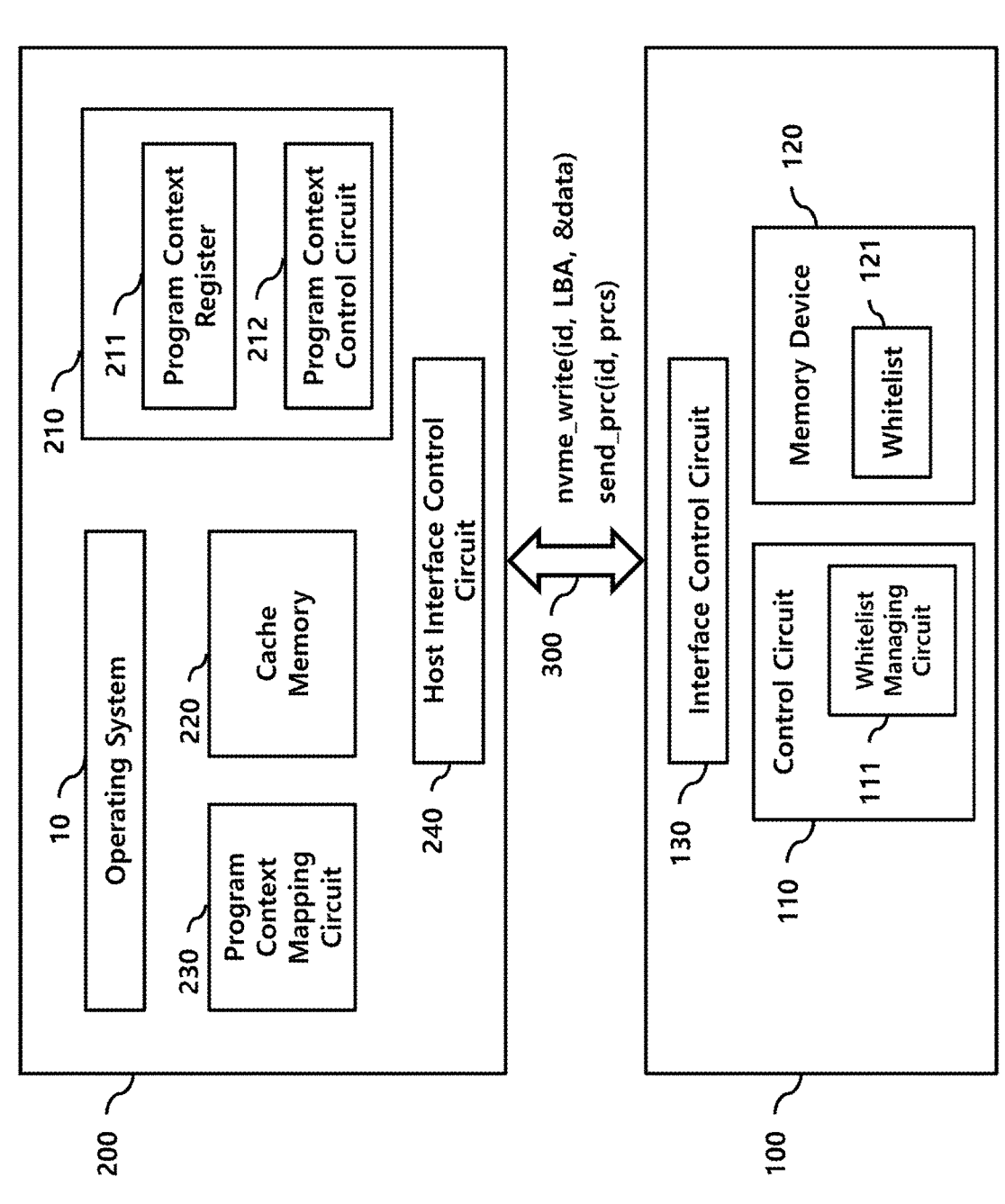
FIG. 3 illustrates a computing system according to an embodiment of the present disclosure.

FIG. 3 is a block diagram illustrating a computing system 1 according to an embodiment of the present disclosure.

The computing system 1 includes a data storage device 100, a host 200, and an interface circuit 300.

In the present embodiment, the data storage device 100 may correspond to an SSD, and a detailed configuration for basic I/O operations thereof is not necessary for the disclosure of the present invention, and thus a description thereof will be omitted.

The data storage device 100 includes a control circuit 110, a memory device 120, and an interface control circuit 130.

The control circuit 110 may be configured to provide a Flash Translation Layer (FTL) used for an address mapping operation, a wear leveling operation, and a garbage collection operation.

The control circuit 110 may be implemented in hardware, software, or a combination thereof, and is not limited to a specific form.

In this embodiment, the control circuit 110 further includes a whitelist managing circuit 111 for managing the whitelist.

The memory device 120 stores the whitelist 121 in a part of a storage space therein.

The whitelist 121 stores a program context corresponding to an I/O operation allowed for the data storage device 100.

It is assumed that the program context included in the whitelist 121 is predetermined and stored in advance.

For example, it is possible to determine program contexts to be added to the whitelist by extracting call and return information for a function occurring in the system through reverse engineering, and by extracting information related to a write operation to the data storage device 100 from the call and return information.

In some embodiments, when the data storage device 100 determines that a program context is not included in the whitelist 121, the program context may be transmitted to the host 200.

The administrator of the computing system 1 may analyze the program context delivered to the host 200 and may add the program context to the whitelist 121 if it is related to a normal I/O operation, thereby eliminating program contexts missing from the whitelist 121; through this, normal operation of the system can be ensured.

In addition, various methods for determining the program context to be stored in the whitelist 121 may exist, and the method is not limited to a specific method.

The whitelist managing circuit 111 compares the whitelist 121 with a program context list PRCS transmitted with the write request generated from the host 200. As explained in more detail below with reference to FIG. 4, the program context list PRCS may include program context values for each I/O operation that has written to all or part of the data corresponding to the write request, which data may be, for example, a cache line that is being flushed.

In FIG. 3, in the nvme_write( ) function, id is an identifier of a write request, and LBA indicates a write address. Also, in the send prc( ) function, id is an identifier of a write request, and prcs indicates a program context list to be delivered.

The whitelist managing circuit 111 compares the program contexts included in the transferred program context list PRCS with the whitelist 121.

In the present embodiment, when at least one of the program contexts included in the program context list is not included in the whitelist 121, the whitelist managing circuit 111 indicates failure.

In response to the failure indication, the control circuit 110 may generate an error message including program context information related to the write request and transmit the error message to the host 200.

The host 200 includes a processor 210, a cache memory 220, a program context mapping circuit 230, and a host interface control circuit 240.

The operating system 10 controls the overall operation of the host 200. The operating system 10 includes software such as a kernel and a file system, and the operation of the computing system 1 on which the operating system 10 is present is a conventional technology. Hereinafter, the invention will be disclosed without repeating disclosure of a conventional art.

Because the processor 210, other than the features described below, corresponds to a CPU and commonly performs the basic operations performed by a conventional CPU, a detailed description of the conventional aspects of the processor 210 will be omitted.

The processor 210 according to the present embodiment includes a program context register 211 and a program context control circuit 212.

The program context register 211 stores a program context corresponding to an I/O operation currently being executed, and stores a plurality of program contexts corresponding to a plurality of I/O operations when a plurality of I/O operations are performed in parallel.

The program context control circuit 212 updates the program context by adding a program counter value corresponding to a called function to the program context register 211 when a function call instruction call or ecall is executed, as shown in FIG. 2B. The program context control circuit 212 may also update the program context when a return instruction is executed, as described below.

As described above, when an instruction ecall that calls a system write function is executed, the system call processing function is automatically called in the kernel mode.

When the system call processing function is executed in the kernel mode, the program context may be read from the program context register 211 and output to the outside of the processor 210.

The cache memory 220 corresponds to a conventional cache memory.

The operation of caching write data is similar to that of the prior art.

That is, in the present embodiment, data corresponding to a write request may be first stored in the cache memory 220, and data selected from the cache memory 220 may be written to the data storage device 300 by a flush operation.

However, as described above, the present embodiment is different from the prior art in that when the host 200 transmits a write request to the data storage device 100, a related program context list is transmitted together with the write request.

As described above, since there may be a difference between a time when a write command is processed by the host 200 and a time when data is actually written in the data storage device 100, it is necessary to temporarily store the program context list.

The program context mapping circuit 230 stores a location of data stored in the cache memory 220 and a program context corresponding thereto.

FIG. 4 shows a data structure of the program context mapping circuit 230.

In the present embodiment, the program context mapping circuit 230 stores a logical address of data, that is, a page number and a program context list corresponding thereto.

For example, page number 100 is associated with program context 27, and page number 500 is associated with two program contexts 79 and 99.

In this way, when a plurality of I/O operations are performed with respect to one page number, a plurality of program contexts may be stored for one page number in the form of a list.

When a flush operation is performed on data in the cache memory 220, a program context list corresponding to the write request is transmitted to the data storage device 100 with reference to the program context mapping circuit 230 together with the cache memory 220.

As described above, when all program contexts included in the program context list are included in the whitelist 121, the write operation is normally performed in the data storage device 100.

When at least one program context included in the program context list is not included in the whitelist 121, the data storage device 100 does not perform a write operation and notifies the host 200 of a failure.

When the host 200 is notified of a failure, the host 200 may perform a logging operation on the program context related to the failure so that an administrator can review it.

As in the related art, the operating system 10 operating in the host 200 includes a file system and manages metadata of files stored in the data storage device 100.

As described above, in the present embodiment, whether the write request has failed can be determined as part of the flush operation and cannot be determined in advance of the flush operation when the write data is cached in the host 100.

Accordingly, in the present embodiment, the host 200 performs an additional operation to ensure consistency of metadata for the file.

When a write request for a file is provided, the host 200 backs up existing metadata corresponding to the file and then updates the metadata for the file.

A part of the address space used by the host 200 may be allocated for backing up the metadata.

When a write request for a corresponding file fails in the data storage device 100 while the file data is flushed, the data may be restored using the backed-up metadata.

In this embodiment, the data protection function is performed using the whitelist of allowed I/O operations.

Accordingly, compared to the case where the data protection function according to the present embodiment is not performed at all, the data I/O performance may be slightly lowered.

Figure 5:
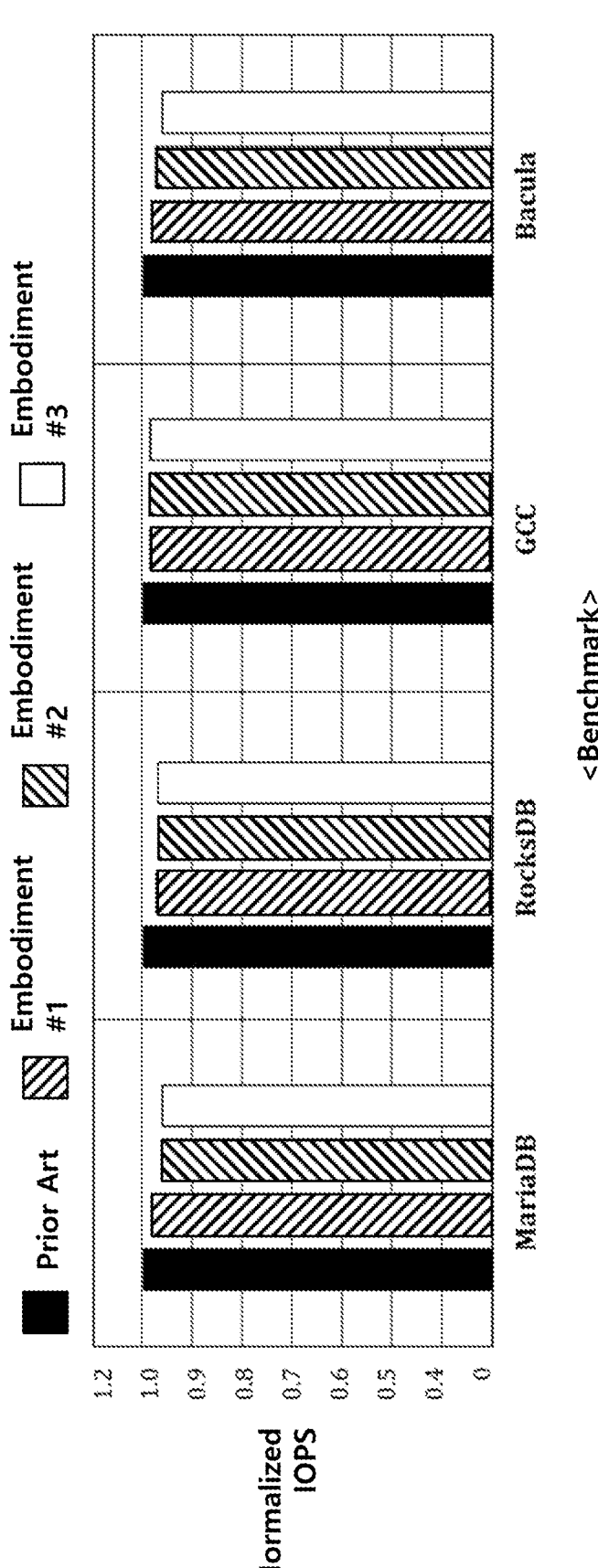
FIG. 5 is a graph illustrating an effect of an embodiment of the present disclosure.

FIG. 5 is a graph of the effect of an embodiment the present disclosure on I/O performance.

In FIG. 5, the horizontal axis indicates types of benchmarks, and the vertical axis indicates number of I/O operations per second (IOPS) normalized based on the prior art. The ratio of reads to writes in each benchmark is 2:8.

Embodiment 1 is a case where 1K entries are stored in the whitelist, Embodiment 2 is a case where 10K entries are stored in the whitelist, and Embodiment 3 is a case where 100K entries are stored in the whitelist.

As shown, in this embodiment, the IOPS performance was lowered compared to the prior art due to the addition of the data protection function. On average, in the case of Embodiment 1, an IOPS decrease of 1.9% occurs, and in the case of Embodiment 3, an IOPS decrease of 3.7% occurs, so that the performance degradation is insignificant.

As described above, the computing system according to the present disclosure can perform a data protection function while minimizing the degradation of I/O performance.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A host device comprising:

a processor operating according to an operating system (OS), wherein the processor includes:

a program counter, a program context register configured to store a program context corresponding to an input/output (I/O) operation; and a program context control circuit configured to update the program context using a value of the program counter of a function corresponding to the I/O operation when the function is called, the function being one of a user function and a system write function, wherein the program context includes a sum of a plurality of values of the program counter, the plurality of values of the program counter including values of the program counter respectively corresponding to a plurality of functions called prior to the I/O operation.

2. The host device of claim 1, wherein the processor outputs an accumulated program counter value accumulated in the program context register as the program context corresponding to the I/O operation when the system write function is called.

3. The host device of claim 1, further comprising:

a cache memory configured to temporarily store write data of the system write function; and a program context mapping circuit configured to associatively store an address of the write data and the program context corresponding to the I/O operation.

4. The host device of claim 3, wherein a write request for a write data and a program context for the write data is transmitted to the data storage device when the write data in the cache memory is flushed to the data storage device.

5. The host device of claim 4, wherein metadata corresponding to the write data is backed up when the write data is stored in the cache memory and backed up metadata is restored when a failure notification is received from the data storage device.

6. The host device of claim 1, wherein the program context control circuit is further configured to update the program context when the function is returned from.

7. The host device of claim 1, wherein the plurality of values of the program counter includes a value of the program counter corresponding to the I/O operation.

* * * * *